(12) United States Patent
Qi et al.

(10) Patent No.: US 8,872,401 B2
(45) Date of Patent: Oct. 28, 2014

(54) SECURING STRUCTURE FOR FAN SENSING ELEMENT

(71) Applicants: Ying-Jun Qi, Shenzhen (CN); Chih-Cheng Lai, Shenzhen (CN)

(72) Inventors: Ying-Jun Qi, Shenzhen (CN); Chih-Cheng Lai, Shenzhen (CN)

(73) Assignee: Asia Vital Components (China) Co., Ltd., Shenzhen (CN)

( * ) Notice: Subject to any disclaimer, the term of this patent is extended or adjusted under 35 U.S.C. 154(b) by 237 days.

(21) Appl. No.: 13/646,287

(22) Filed: Oct. 5, 2012

(65) Prior Publication Data

US 2014/0097727 A1    Apr. 10, 2014

(51) Int. Cl.
  *H02K 11/00*    (2006.01)
(52) U.S. Cl.
  USPC ............................. 310/71; 310/68 B; 310/194
(58) Field of Classification Search
  USPC ................. 310/68 B, 68 R, 71, 194, 400–417
  See application file for complete search history.

(56) References Cited

U.S. PATENT DOCUMENTS

| | | | | |
|---|---|---|---|---|
| 4,259,603 A | * | 3/1981 | Uchiyama et al. | 310/68 B |
| 4,934,041 A | * | 6/1990 | Hoover et al. | 29/596 |
| 4,961,017 A | * | 10/1990 | Kakinoki et al. | 310/71 |
| 4,987,399 A | * | 1/1991 | Nakamura et al. | 336/192 |
| 5,173,628 A | * | 12/1992 | Yoshida et al. | 310/71 |
| 2006/0012261 A1 | * | 1/2006 | Ku et al. | 310/215 |
| 2008/0054735 A1 | * | 3/2008 | Yoshida et al. | 310/43 |
| 2010/0084950 A1 | * | 4/2010 | Onozawa et al. | 310/68 B |
| 2011/0198952 A1 | * | 8/2011 | Nakamura et al. | 310/71 |
| 2012/0235524 A1 | * | 9/2012 | Sasaki et al. | 310/71 |

* cited by examiner

*Primary Examiner* — Thanh Lam
(74) *Attorney, Agent, or Firm* — C. G. Mersereau; Nikolai & Mersereau, P.A.

(57) ABSTRACT

A securing structure for fan sensing element includes a substrate and a stator. The substrate has a first face and at least one electronic element plug-in connected to the first face. The stator is correspondingly disposed on the substrate. The stator has a silicon steel sheet assembly, a first insulation support and a second insulation support. Two sides of the silicon steel sheet assembly are respectively connected to the first and second insulation supports. The second insulation support is formed with a cavity in a position where the electronic element is positioned, whereby the electronic element is received in the cavity. Accordingly, when assembling the stator and the electronic element, the displacement of the stator and the electronic element can be avoided. In addition, the windings are prevented from being damaged.

7 Claims, 6 Drawing Sheets

SECURING STRUCTURE FOR FAN SENSING ELEMENT

BACKGROUND OF THE INVENTION

1. Field of the Invention

The present invention relates to a securing structure for fan sensing element, which can eliminate the problem of displacement of the stator and the electronic element and prevent the windings from being damaged.

2. Description of the Related Art

In the modern society, cooling fans with heat dissipation function have become very important components in various electronic products. The cooling fans are applied to many electronic devices ranging from small-size portable electronic devices to large-size electronic equipments of transportation tools. When an electronic device operates, high heat is often generated at the same time to affect the working efficiency of the electronic device or even cause crash of the electronic device. Therefore, the electronic device generally needs a cooling fan to dissipate the heat and lower the temperature of the electronic device so as to keep the electronic device stably working. The reliability and durability of the fan itself are also key factors to ensure that the electronic device works stably. Therefore, nowadays, all the existent fan manufacturers are striving to develop more diversified fans to satisfy various heat dissipation requirements.

Please refer to FIGS. 1A and 1B. FIG. 1A is a perspective exploded view of a conventional securing structure for fan sensing element. FIG. 1B is a perspective assembled view of the conventional securing structure for fan sensing element. The conventional securing structure for fan sensing element includes a stator assembly 10 and a circuit board 11. The stator assembly 10 includes multiple silicon steel sheets 101 and at least one insulation support 102. A sensing element 11 is disposed on the circuit board 11. The sensing element 111 on the market is generally secured to the circuit board 11 by means of surface mount technology (SMT) or by means of plug-in connection. When assembling the stator assembly 10 with the circuit board 11, due to the tolerances of the respective components of the fan, the stator assembly 10 and the sensing element 111 are often displaced from their true positions. This will cause the problem of rotational speed deviation. In addition, when assembling the stator assembly 10 and the sensing element 111, the windings 12 are often abraded by the sensing element 111. This will damage the windings 12.

According to the above, the conventional technique has the following shortcomings:
1. The stator assembly and the sensing element are often displaced from their true positions.
2. The displacement of the stator assembly and the sensing element will cause the problem of rotational speed deviation.
3. The windings are likely to be damaged.

SUMMARY OF THE INVENTION

It is therefore a primary object of the present invention to provide a securing structure for fan sensing element, which can eliminate the problem of displacement of the stator and the electronic element.

It is a further object of the present invention to provide the above securing structure for fan sensing element, which can eliminate the problem of rotational speed deviation due to the displacement of the stator and the electronic element.

It is still a further object of the present invention to provide the above securing structure for fan sensing element, which can prevent the windings from being damaged.

To achieve the above and other objects, the securing structure for fan sensing element of the present invention includes a substrate and a stator. The substrate has a first face and at least one electronic element plug-in connected to the first face. The stator is correspondingly disposed on the substrate. The stator has a silicon steel sheet assembly, a first insulation support and a second insulation support. Two sides of the silicon steel sheet assembly are respectively connected to the first and second insulation supports. The second insulation support is formed with a cavity in a position where the electronic element is positioned, whereby the electronic element is received in the cavity.

In the above securing structure for fan sensing element, the cavity is formed on the second pole of the second insulation support. When assembling the stator and the electronic element, the stator and the electronic element are prevented from displacing from their true positions. In this case, the problem of rotational speed deviation due to the displacement of the stator and the electronic element can be eliminated. In addition, when assembling the stator and the electronic element, the electronic element is connected in the cavity so that the windings wound around the stator are prevented from being scraped or damaged.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
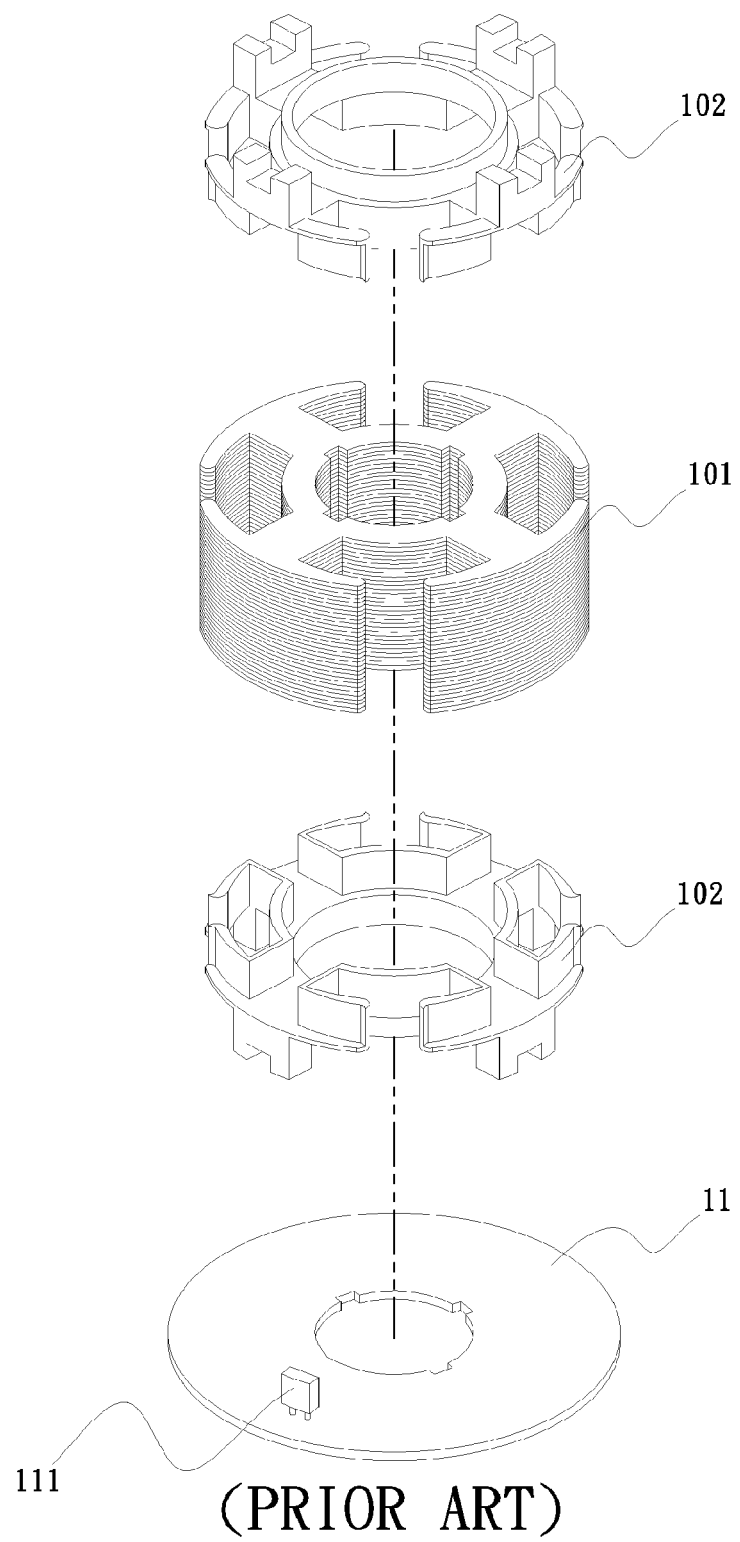
FIG. 1A is a perspective exploded view of a conventional securing structure for fan sensing element.
Figure 1B:
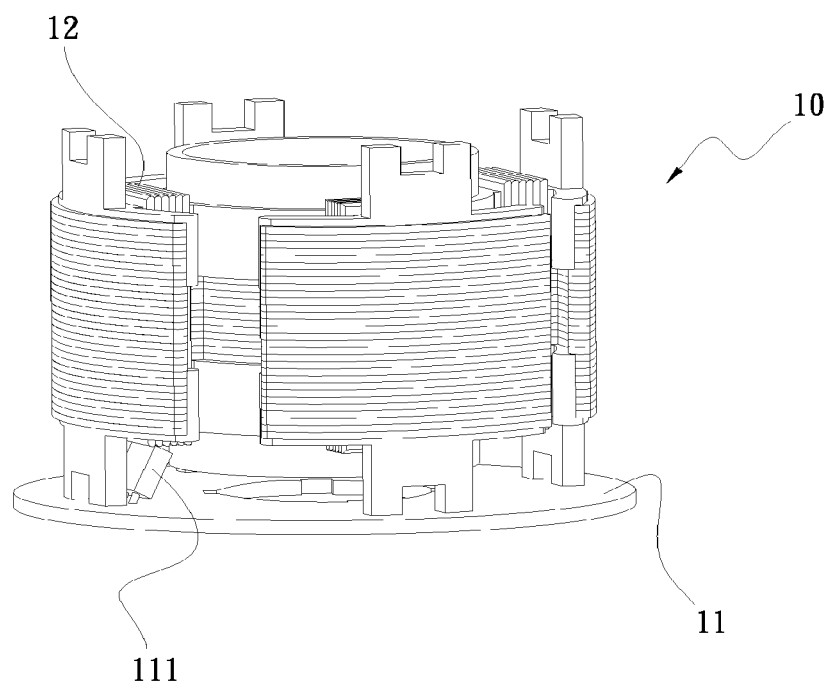
FIG. 1B is a perspective assembled view of the conventional securing structure for fan sensing element.
Figure 2A:
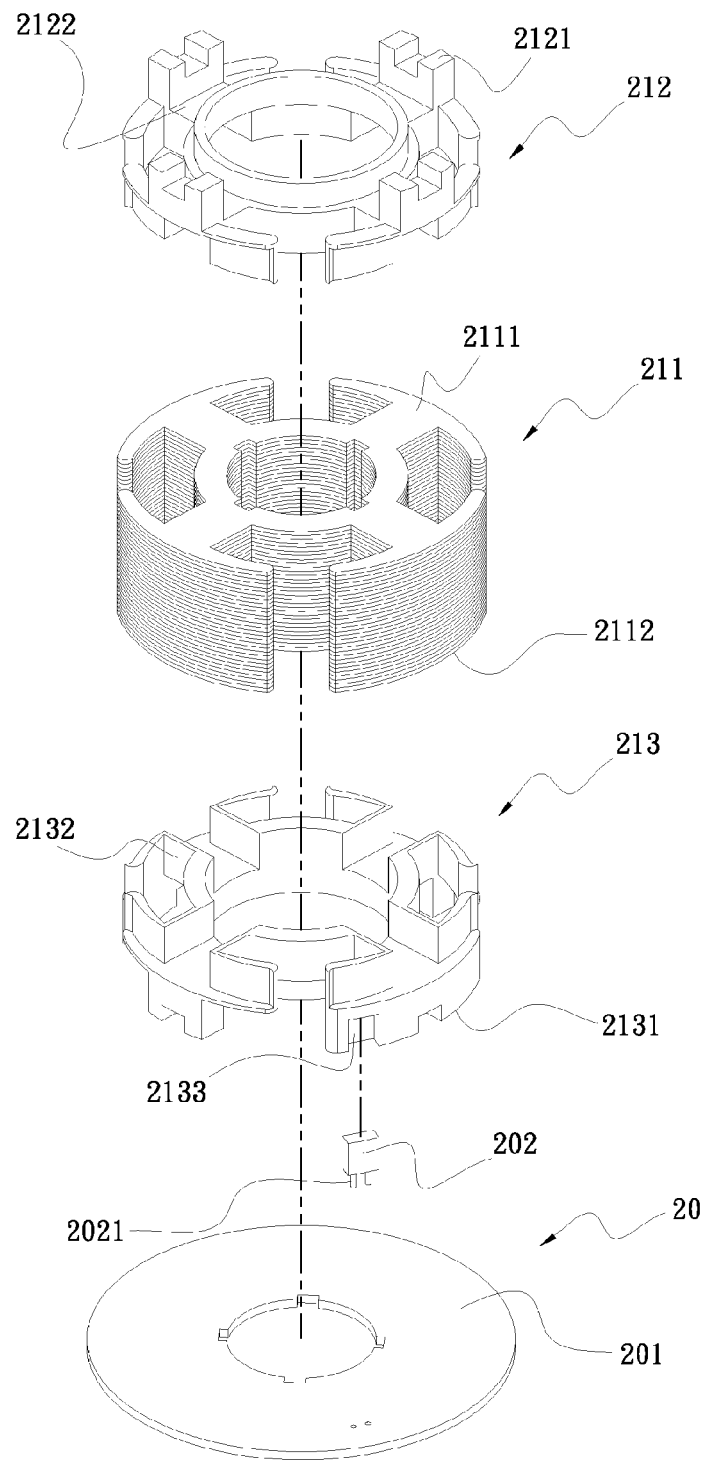
FIG. 2A is a perspective exploded view of a first embodiment of the securing structure for fan sensing element of the present invention.
Figure 2B:
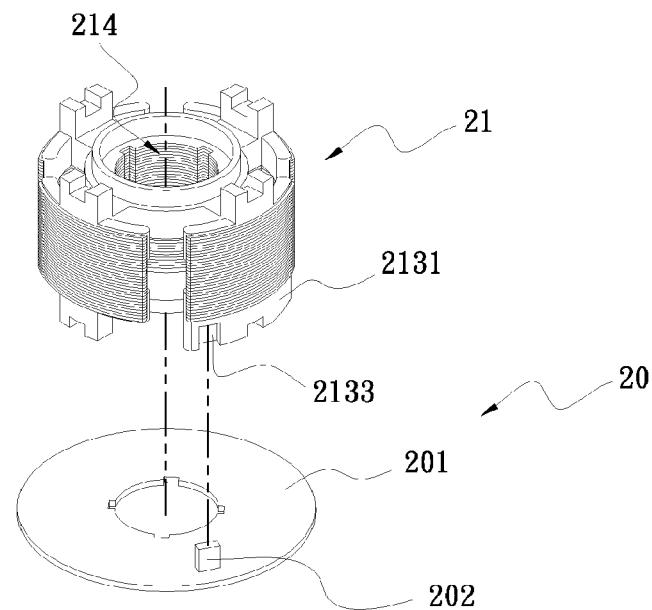
FIG. 2B is another perspective exploded view of the first embodiment of the securing structure for fan sensing element of the present invention.
Figure 2C:
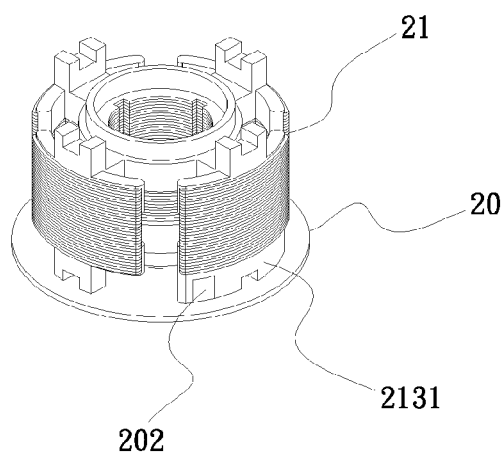
FIG. 2C is a perspective assembled view of the first embodiment of the securing structure for fan sensing element of the present invention.
Figure 2D:
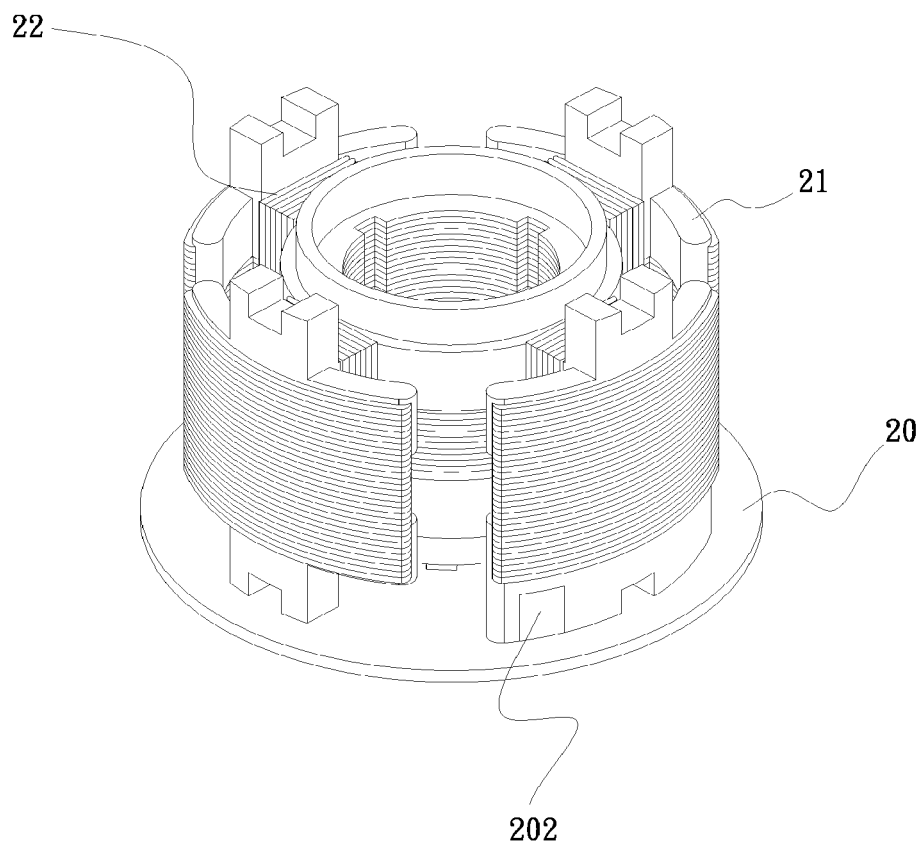
FIG. 2D is another perspective assembled view of the first embodiment of the securing structure for fan sensing element of the present invention.

Please refer to FIGS. 2A, 2B, 2C and 2D. FIG. 2A is a perspective exploded view of a first embodiment of the securing structure for fan sensing element of the present invention. FIG. 2B is another perspective exploded view of the first embodiment of the securing structure for fan sensing element of the present invention. FIG. 2C is a perspective assembled view of the first embodiment of the securing structure for fan sensing element of the present invention. FIG. 2D is another perspective assembled view of the first embodiment of the securing structure for fan sensing element of the present invention. According to the first embodiment, the securing structure for fan sensing element of the present invention includes a substrate 20 and a stator 21. The substrate 20 has a first face 201 and at least one electronic element 202. The electronic element 202 has a plug-in connection section 2021 plugged in the first face 201.

The stator 21 is correspondingly disposed on the substrate 20. The stator 21 has a silicon steel sheet assembly 211, a first insulation support 212 and a second insulation support 213. Two sides of the silicon steel sheet assembly 211 are respectively connected to the first and second insulation supports 212, 213. The silicon steel sheet assembly 211 has a first end face 2111 and a second end face 2112. The first insulation support 212 is connected to the first end face 2111, while the second insulation support 213 is connected to the second end face 2112. The stator 21 is formed with a central through hole 214 axially passing through the silicon steel sheet assembly 211 and the first and second insulation supports 212, 213.

The first and second insulation supports 212, 213 respectively have multiple first poles 2121 and multiple second poles 2131. The first poles 2121 are respectively aligned with the second poles 2131. The first and second insulation supports 212, 213 further respectively have a first winding section 2122 and a second winding section 2132. Multiple windings 22 are wound on the first and second winding sections 2122, 2132 (as shown in FIG. 2D).

The second insulation support 213 is formed with a cavity 2133 in a position where the electronic element 202 is positioned. The electronic element 202 is correspondingly received in the cavity 2133. In this embodiment, the cavity 2133 is formed on, but not limited to, the second pole 2131 in a position where the electronic element 202 is positioned for illustration purposes only. Alternatively, the cavity 2133 can be formed on a different part of the second insulation support 213 according to the type of the fan.

In the securing structure for fan sensing element of the present invention, the cavity 2133 is formed on the second pole 2131 of the second insulation support 213. When assembled, the first insulation support 212 is correspondingly assembled with the first end face 2111, while the second insulation support 213 is correspondingly assembled with the second end face 2112. The electronic element 202 plugged in the first face 201 of the substrate 20 is correspondingly received in the cavity 2133 of the second pole 2131. Accordingly, when assembling the stator 21 and the electronic element 202, the displacement of the stator 21 and the electronic element 202 can be avoided and the stator 21 can be located in a true position. In this case, the problem of rotational speed deviation due to the displacement of the stator 21 and the electronic element 202 can be eliminated. In addition, when assembling the stator 21 and the electronic element 202, the electronic element 202 is connected in the cavity 2133 so that the windings 22 wound around the stator 21 are prevented from being scraped or damaged.

Figure 3A:
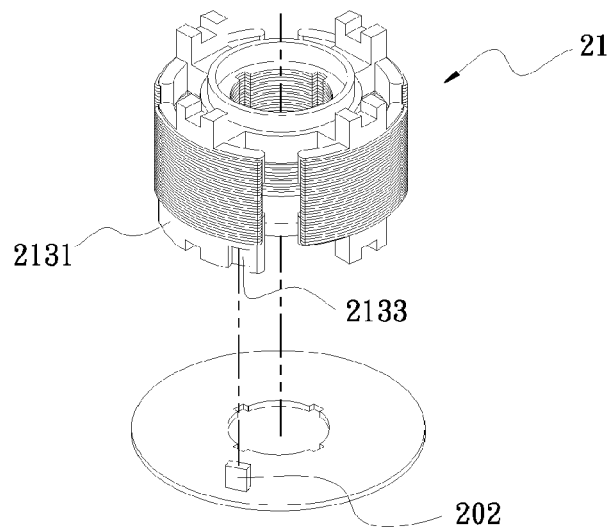
FIG. 3A is a perspective exploded view of a second embodiment of the securing structure for fan sensing element of the present invention.
Figure 3B:
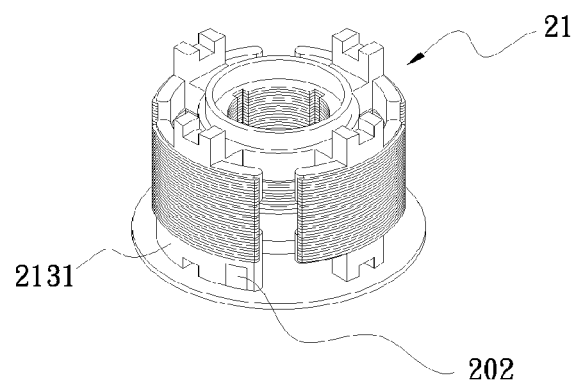
FIG. 3B is another perspective exploded view of the second embodiment of the securing structure for fan sensing element of the present invention.

Please now refer to FIGS. 3A and 3B as well as FIG. 2D. FIG. 3A is a perspective exploded view of a second embodiment of the securing structure for fan sensing element of the present invention. FIG. 3B is a perspective assembled view of the second embodiment of the securing structure for fan sensing element of the present invention. The second embodiment is partially identical to the first embodiment in components and connection relationship between the components and thus will not be repeatedly described hereinafter. The second embodiment is mainly different from the first embodiment in that the cavity 2133 is formed on another section of the second pole 2131. When assembled, the electronic element 202 plugged in the first face 201 of the substrate 20 is correspondingly received in the cavity 2133. Accordingly, when assembling the stator 21 and the electronic element 202, the displacement of the stator 21 and the electronic element 202 can be avoided and the stator 21 can be located in a true position. In this case, the problem of rotational speed deviation due to the displacement of the stator 21 and the electronic element 202 can be eliminated. In addition, when assembling the stator 21 and the electronic element 202, the electronic element 202 is connected in the cavity 2133 so that the windings 22 wound around the stator 21 are prevented from being scraped or damaged.

According to the aforesaid, in comparison with the conventional technique, the present invention has the following advantages:

1. The displacement of the stator and the electronic element is avoided.
2. The problem of rotational speed deviation is eliminated.
3. The windings are prevented from being damaged.

The present invention has been described with the above embodiments thereof and it is understood that many changes and modifications in the above embodiments can be carried out without departing from the scope and the spirit of the invention that is intended to be limited only by the appended claims.

What is claimed is:

1. A securing structure for fan sensing element, comprising:
   a substrate having a first face and at least one electronic element, the electronic element being plug-in connected to the first face; and
   a stator correspondingly disposed on the substrate, the stator having a silicon steel sheet assembly, a first insulation support and a second insulation support, two sides of the silicon steel sheet assembly being respectively connected to the first and second insulation supports, the second insulation support being formed with a cavity in a position where the electronic element is positioned, the electronic element being correspondingly received in the cavity.

2. The securing structure for fan sensing element as claimed in claim 1, wherein the first and second insulation supports respectively have multiple first poles and multiple second poles, the first poles being respectively aligned with the second poles.

3. The securing structure for fan sensing element as claimed in claim 2, wherein the cavity is formed on the second pole in a position where the electronic element is positioned.

4. The securing structure for fan sensing element as claimed in claim 1, wherein the first and second insulation supports further respectively have a first winding section and a second winding section, multiple windings being wound on the first and second winding sections.

5. The securing structure for fan sensing element as claimed in claim 1, wherein the silicon steel sheet assembly has a first end face and a second end face, the first and second insulation supports being respectively connected to the first and second end faces.

6. The securing structure for fan sensing element as claimed in claim 1, wherein the stator is formed with a central through hole axially passing through the silicon steel sheet assembly and the first and second insulation supports.

7. The securing structure for fan sensing element as claimed in claim 1, wherein the electronic element has a plug-in connection section plugged in the first face of the substrate.

\* \* \* \* \*